United States Patent [19]

Mock

[11] Patent Number: 5,863,655
[45] Date of Patent: Jan. 26, 1999

[54] PLASTICS CLOSURE UNIT AND A METHOD FOR THE MANUFACTURE THEREOF

[75] Inventor: Elmar Mock, Biel, Switzerland

[73] Assignee: Tetra Laval Holdings & Finance S. A., Switzerland

[21] Appl. No.: 387,936

[22] PCT Filed: Jun. 26, 1994

[86] PCT No.: PCT/EP94/02072

§ 371 Date: Jun. 15, 1995

§ 102(e) Date: Jun. 15, 1995

[87] PCT Pub. No.: WO95/01288

PCT Pub. Date: Jan. 12, 1995

[30] Foreign Application Priority Data

Jun. 30, 1993 [CH] Switzerland ........................... 01973/93
Jun. 30, 1993 [CH] Switzerland ........................... 01974/93

[51] Int. Cl.[6] ........................... B65D 51/00; B29C 45/00
[52] U.S. Cl. ..................... 428/411.1; 428/475.2;
428/476.3; 428/483; 428/515; 428/66.3;
428/66.6; 428/212; 215/235; 215/306; 215/364;
264/328.8; 264/328.11; 264/331.11; 264/345;
264/299
[58] Field of Search ................... 428/66.3, 66.4,
428/66.6, 212, 411.1, 475.2, 476.3, 483,
515; 215/235, 243, 244, 245, 236, 237,
238, 306, 355, 364; 220/200, 254, 375;
222/498, 499; 264/328.1, 328.8, 328.11,
331.11, 80, 234, 241, 242, 299, 345

[56] References Cited

U.S. PATENT DOCUMENTS 4,132,225  1/1979  Whattam .

| 4,489,844 | 12/1984 | Breskin | 215/329 |
|---|---|---|---|
| 4,784,817 | 11/1988 | Towns et al. | 264/219 |
| 4,826,029 | 5/1989 | Skoglie | 217/110 |
| 4,885,121 | 12/1989 | Patel | 264/255 |
| 5,048,730 | 9/1991 | Forsyth et al. | 222/482 |
| 5,289,930 | 3/1994 | Inouye | 215/235 |
| 5,372,284 | 12/1994 | Mock | 222/153 |
| 5,439,124 | 8/1995 | Mock | 215/40 |
| 5,460,768 | 10/1995 | Akao et al. | 264/297.2 |

FOREIGN PATENT DOCUMENTS 0546991  6/1993  European Pat. Off. .
2661127  10/1991  France .

*Primary Examiner*—Marie Yamnitzky
*Attorney, Agent, or Firm*—Killworth, Gottman, Hagan & Schaeff, L.L.P.

[57] ABSTRACT

The closure unit consists of an outlet part (10) and a closure part (20) which is joined to the outlet part even in the open condition, wherein both parts are sealed to each other by a pair of sealing faces in the closed condition of the closure unit. The closure unit has a region made of outlet material (A) and a region made of closure material (B), which two regions are joined together by a flow seam. The flow seam extends in such a way through the closure unit that at least parts of the sealing face on the side of the outlet are made of outlet material and that at least parts of the sealing face on the side of the closure are made of closure material. The closure unit is manufactured by way of a simultaneous casting method. The pairing of materials and the casting parameters of the two simultaneous casting processes are such that the two materials meet at the position provided for the flow seam and form a flow seam (31). The position and shape of the flow seam can also be defined by movable hollow mould parts (pushing devices).

7 Claims, 6 Drawing Sheets

PLASTICS CLOSURE UNIT AND A METHOD FOR THE MANUFACTURE THEREOF

The invention relates to a plastics closure unit having an outlet part, a closure part which is joined to the outlet part even when the closure unit is in an open condition, and at least one pair of sealing faces which seals the outlet part and the closure part together when the closure unit is in a closed condition and also to a method for manufacture of such a plastics closure unit.

The invention also relates secondly to a plastics closure with an opening part and a closure part which are designed in such a way that when the closure unit is in the closed condition at least one sealing face on the opening part is pressed mechanically against a corresponding sealing face on the closure part, and the invention relates thirdly to a method for the manufacture of this closure which is manufactured in the open condition by a casting operation and which is closed after manufacture.

Plastics closure units which have an outlet part and a closure part are know for use e.g. on glass or metal formed bodies etc. Advantageously, these closure units are designed in such a way that the closure part is joined to the outlet part even in the open condition and that they can also be re-closed sealingly to a certain extent after the first opening.

Such closure units are usually manufactured by way of an injection-moulding method. If the closure unit is made of one material and is cast in the open condition, the manufacture consists of one single casting step and is therefore very economical. However, since the outlet part has a different function from that of the closure part, if a closure unit is made of only one material, that material obviously cannot give optimum performance of both functions, i.e. in other words, compromises have to be made in the selection of the material. These compromises often result in not very good sealing of the closed or re-closed closure unit.

Closure units are also known which are made of two or more different materials whereby the afore-mentioned problem can be avoided. These types of closure unit usually consist of an outlet part and a closure part or parts of those parts which are manufactured separately from different materials, wherein, when the closure unit is in the open condition, the outlet part and closure part are not secured together and only form an actual unit in the closed condition. The individual parts are then usually joined together in an additional assembly step, e.g. by joining form fit means provided, by pasting together, welding etc., which increases the cost of manufacture.

The aim of the invention is to create a closure unit which combines the advantage of having one closure unit made of at least two materials with the advantages of having a closure unit made of only one material. In other words, this means that the closure unit is one where the individual parts give optimum performance in respect of their functions by virtue of suitable material, but is nonetheless able to be manufactured in one single casting process and without additional assembly steps to join individual parts together.

This problem is solved by the closure unit and the method of manufacture as defined in the claims.

The closure unit according to the invention has an outlet part and a closure part which are joined together even when the closure unit is in the open condition, and it is made of at least two materials, wherein the regions of both materials are joined together by a flow seam. This flow seam is disposed, for example, in the connecting region between the outlet part and the closure part in such a way that the outlet part is made entirely of outlet material and that the closure part is made entirely of closure material. However, the flow seam can also extend through one of the parts whereby that part is made of the two materials. In each case, the flow seam extends between the regions of the two materials in such a way that the pair of sealing faces by means of which the closure unit is kept sealed in the closed condition consists at least partly of a sealing face, on the side of the outlet part, which is made of outlet material and of a sealing face, on the side of the closure part, which is made of closure material.

The flow seam between the two materials is produced by casting together the two materials towards each other. The flow seam can be a frontal flow seam which is produced by the two materials meeting one another in a castable or flowable condition. The flow seam can also be a cold flow seam which is produced by one of the materials in a castable or flowable condition meeting the other material which has already cooled somewhat. A shear flow seam is also possible.

The closure unit is produced by the two materials being cast into a casting cavity which basically represents the negative of the closure unit in the open condition, from two or more different casting openings, and by the casting parameters being set such that two materials meet at the place in the cavity provided for the flow seam, in the condition provided. As will be described in greater detail hereinafter, it can be advantageous or necessary to provide pushing devices in the casting cavity, which pushing devices are displaced during the casting operation. The casting parameters which are relevant to the position and quality of the flow seam are the casting temperatures, casting speeds, temporal coordination of the two quasi simultaneous casting operations and the length and extent of the holding pressure, or pressures, corresponding to each pair of materials and each shape of closure unit.

The material of the outlet is adapted to the manner in which the closure unit is to be secured to the formed body, i.e. in other words, it may be capable of being welded or stuck, etc. The pairing of the materials of the outlet and of the closure is selected in such a way that they are together capable of forming a pair of sealing faces which seal properly; i.e. it is advantageous if only one of the materials is stiff and if the other is flexible and can conform to it.

By way of example, the material of the outlet has properties such that the outlet part has sufficient stability to impart to the closure unit sufficient mechanical strength for use, transportation etc. The material of the closure has properties such that it is sufficiently flexible and elastic to be able to conform to the sealing faces of the outlet material to give an optimally sealed connection, and such that it is sufficiently elastic to be able to withstand undesirable deformation when the closure unit is being opened and closed. In addition, the closure material can have features to provide a decoration, as desired.

However, it is also possible for the closure material to be stiffer than the outlet material.

If the closure unit is to be re-used it is advantageous if both materials are selected from the same group of plastics. However, this is not a compulsory criterium for manufacture. Suggested examples of pairs of materials are non-crystalline and part-crystalline polypropylene (PP) or low density polyethylene (LD-PE) and high density polyethylene (HD-PE). In the case of chemically resistant closure units, soft and hard polyvinyl chloride (PVC) can also be used. Other pairs of materials consisting of a polymer filled with inorganic materials (e.g. glass), and the same polymer without filling material or the same polymer in solid and foam form can be used. For closure units with a high gas density, suitable pairs of materials consist of polyester (PET), polypropylene (PP) or polyethylene (PE) as the base material and of ethylene vinyl alcohol copolymer (EVOH), semi-crystalline polyamide (MXD-6) manufactured by polycondensation of metaxylene diamine and adipic acid, liquid-crystal polymer (LCP), polyethylene naphthalate (PEN), polyacrylonitrile (PAN), non-crystalline polyamide (APA), polyvinylidene chloride (PVDC) or a polymer filled with a scavenger (adsorption resin) as the barrier material.

It has been shown that in a pair of materials where one is a crystalline or part crystalline plastics material and the other is a non-crystalline plastics material good flow seams can be produced if a second order transition temperature of the crystalline material is within the melting range of the non-crystalline material, and if the two materials meet in this temperature range. An example of a pair of materials is the afore-mentioned combination of part crystalline and non crystalline polypropylene.

In addition to joining the two materials by way of the flow seam, the flow seam can also be designed in such a way that it represents a form fit.

The closure to which the invention relates in the second instance also has a part with an opening (opening part) and a part (closure part) which closes the opening of the opening part. Therein, the opening part may, for example, be a complete formed body of plastics material with an opening, or, alternatively, the outlet part of a closure unit, as used on glass- or metal formed bodies, for example. The closure is closed if the closure part is placed over the opening part, and is opened if the closure part is lifted off or pivoted open. Plastics closure units which have an outlet part (opening part) and a closure part are, as indicated hereinabove, manufactured by injection-moulding techniques: either in one part with a connecting part which permanently connects the outlet part and the closure part, or in two parts in the form of a separate outlet part and separate closure part. Plastics formed bodies and their associated closure parts (tops) are usually also manufactured separately. Usually, these types of closures are therefore manufactured in the open condition and are then closed in a further manufacturing step before or after assembly of the formed body and/or the filling thereof.

The hollow moulds for the opening part and closure part of such closures are designed in such a way that both parts have sealing faces which are pressed against one another by a mechanical closing process, wherein a form-fit between the closure part and the opening part is produced for this closing operation by way of form-fit means. The form fit may be produced by a screw thread, or, in the case of snap-shut closures, by an appropriate deformation of at least one part. The sealing which can be obtained by these sealing faces pressed against each other is usually quite adequate for powders and liquids, and also remains properly sealed after the pack has been opened and re-closed a number of times. However, particularly with considerably longer storage times, it is not sealed sufficiently against gases and germs.

In order to obtain sealing for gases and germs, aluminium foil may be inserted into the afore-described closures as an additional sealing means or barrier to gases. The aluminium foil must then be removed on the initial opening.

A second task of the invention is to create a plastics closure with an opening part and a closure part which is sealed against gases and germs in a way which substantially corresponds to the sealing of the material of the closure against gases and germs, without additional sealing means, at least until initial opening. This means, in other words, that, when new, the sealing properties of the closure according to the invention should be as if the opening part and closure part had been provided in the form of an inseparable part. In addition, a third task of the invention is to disclose a method for manufacturing the closure unit according to the invention.

This latter task is solved for the plastics closure with an opening part and a closure part designed in such a way that in the closed condition of the closure unit at least one sealing face on the opening part is pressed mechanically against a corresponding sealing face on the closure part, in that before the closure unit is opened for the first time at least one sealing face on the closure part adheres to a corresponding sealing face on the opening part in such a way that the first opening operation requires greater strength than any subsequent opening operation, but that the sealing faces are not damaged during the first opening operation. The method which is considered in the third instance is further characterised in that at least one pair of sealing faces is subjected to a heat treatment, that its sealing faces adhere together in such a way that on initial opening they can be separated with a reasonable amount of force, without the sealing faces being damaged.

The second closure according to the invention has at least one pair of sealing faces, whose sealing faces, prior to opening for the first time, are not only pressed together mechanically, but also adhere together. This additional adhesive connection is essentially produced by subjecting at least one of the sealing faces of the pair of sealing faces to a heat treatment. The heat treatment is carried out with the sealing faces pressed against one another, that is to say when the closure is closed or directly before the closure is closed. Therein, the materials of the opening part and of the closure part and the heat treatment parameters are selected in such a way that the adhesive connection can be released with reasonable strength by the user when opening the closure for the first time, wherein the adhesive connection is destroyed irreversibly, the mechanical sealing capacity of the pair of sealing faces not, however, being impaired.

If the closure is re-closed after being opened for the first time, the pair of sealing faces (or the pairs of sealing faces) is/are mechanically pressed together again. The additional adhesive connection is then missing.

A further advantage of a closure with an adhesive connection between the sealing faces of the opening part and closure part is that the inner side or outer side of the closure can be coated with a barrier material, e.g. silicon oxide or aluminium, to further increase sealing against gas, which greatly reduces the risk of the coating being damaged by relative movement between the two parts.

It is also possible that the mechanical sealing function is quasi separate from the adhesive connection in that one pair of sealing faces effects good mechanical sealing, whilst a second pair of sealing faces offers less good mechanical sealing and mainly takes care of the additional sealing by way of an adhesive connection.

The sealing faces are easily welded by ultra-sound as a pair to produce the adhesive connection, e.g. after the closure has been closed. Also, one of the sealing faces, or both sealing faces, can be heated by hot air or a flame directly before the closure unit is closed, wherein, on using a suitable flame the surfaces in question are simultaneously de-oxidized. Heating is also possible by high voltage discharge. Friction welding is also possible to produce the adhesive connection between the sealing faces.

The two sealing faces to be joined together by the heat treatment can be of the same plastics material or of different plastics materials. Different plastics materials are advantageous if the requirements of the two parts differ, e.g. in respect of flexibility, as can be the case with a snap-shut closure. Examples of pairs of materials which can be used in this connection are again part crystalline and non-crystalline polypropylene, high and low density polyethylene, hard and soft polyvinyl chloride, polymer filled with an inorganic material (e.g. glass) and unfilled polymer, solid and foam polymer. Further possible pairs of materials are polyester (PET), polypropylene(PP) or polyethylene (PE) as the one material and ethylene vinyl alcohol copolymer (EVOH), semi-crystalline polyamide (MXD-6) manufactured by polycondensation of metaxylene diamine and adipic acid, liquid-crystal polymer (LCP), polyethylene naphthalate (PEN), polyacrylonitrile (PAN), non-crystalline polyamide (APA), polyvinylidene chloride (PVDC) or a polymer filled with an adsorption resin as the other material.

The closure unit and method according to the invention for the manufacture thereof will be described in greater detail hereinafter by way of embodiments which are given by way of example. In the drawings, FIG. 1 is an embodiment of the closure unit according to the invention, by way of example, in the condition in which it has just been manufactured, thus in the open condition (section);

Figure 6:
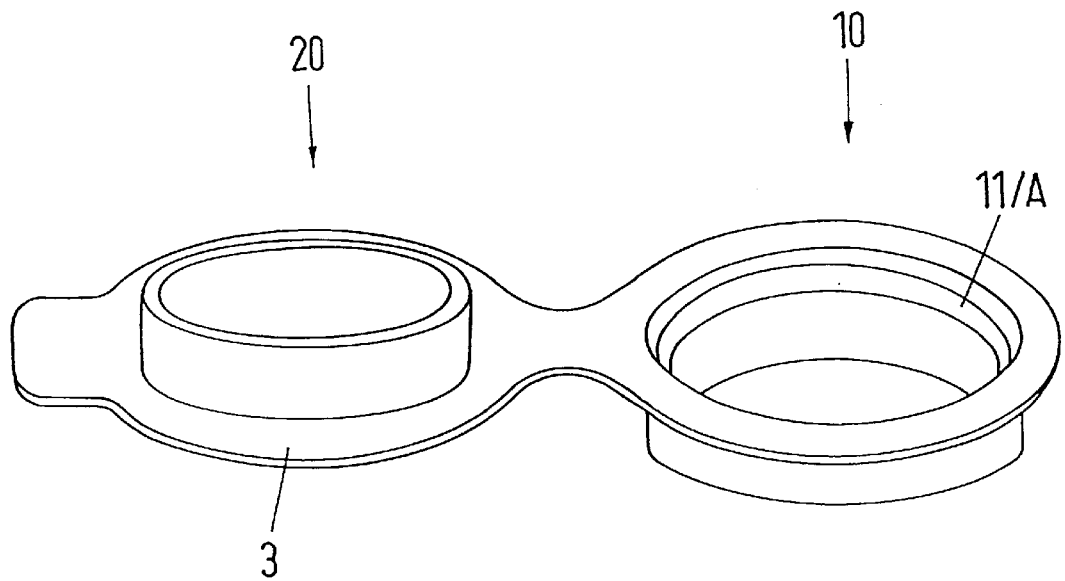
Figure 7:
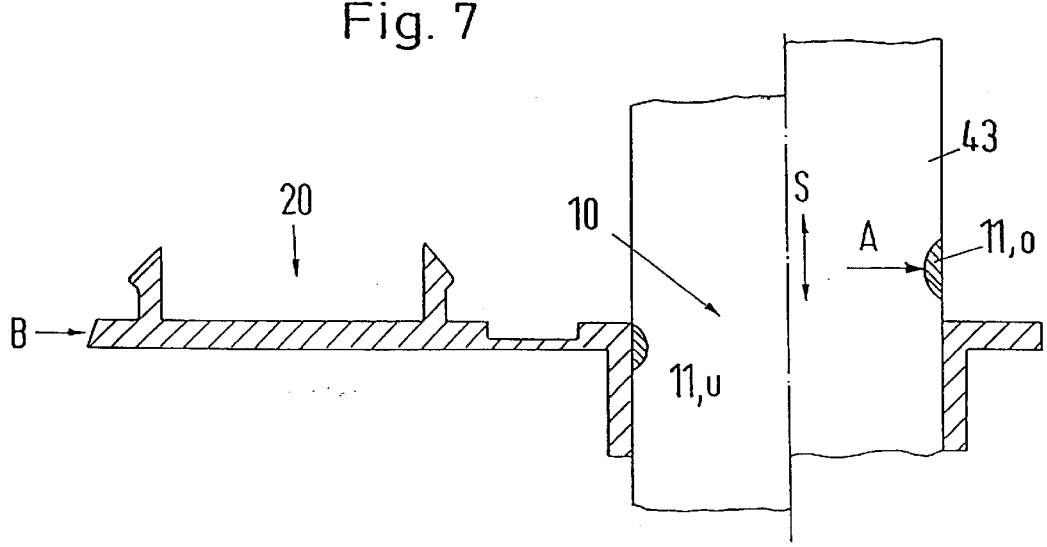
Figure 8:
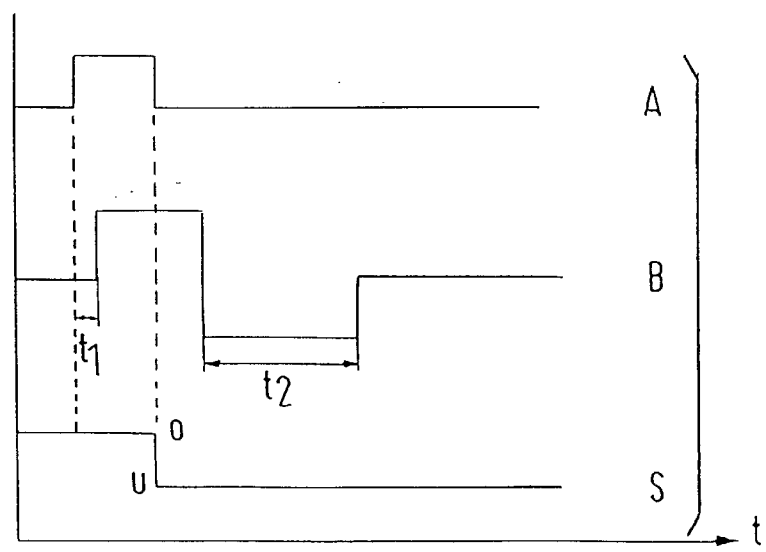
Figure 9:
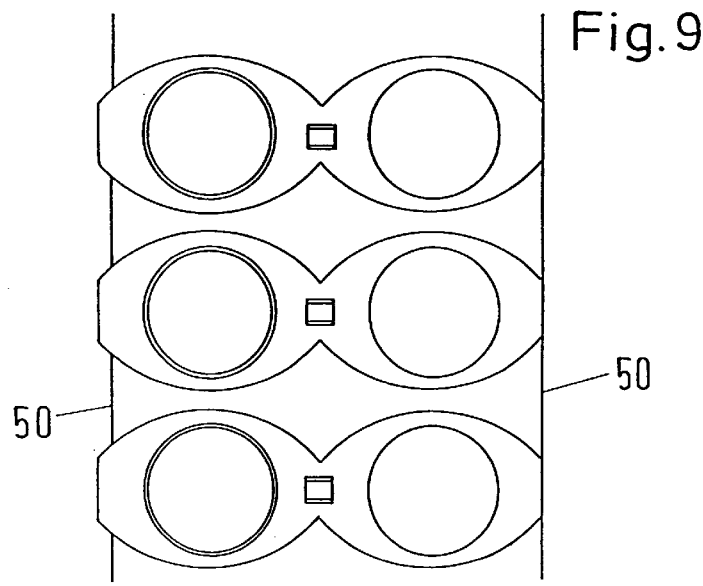
Figure 10:
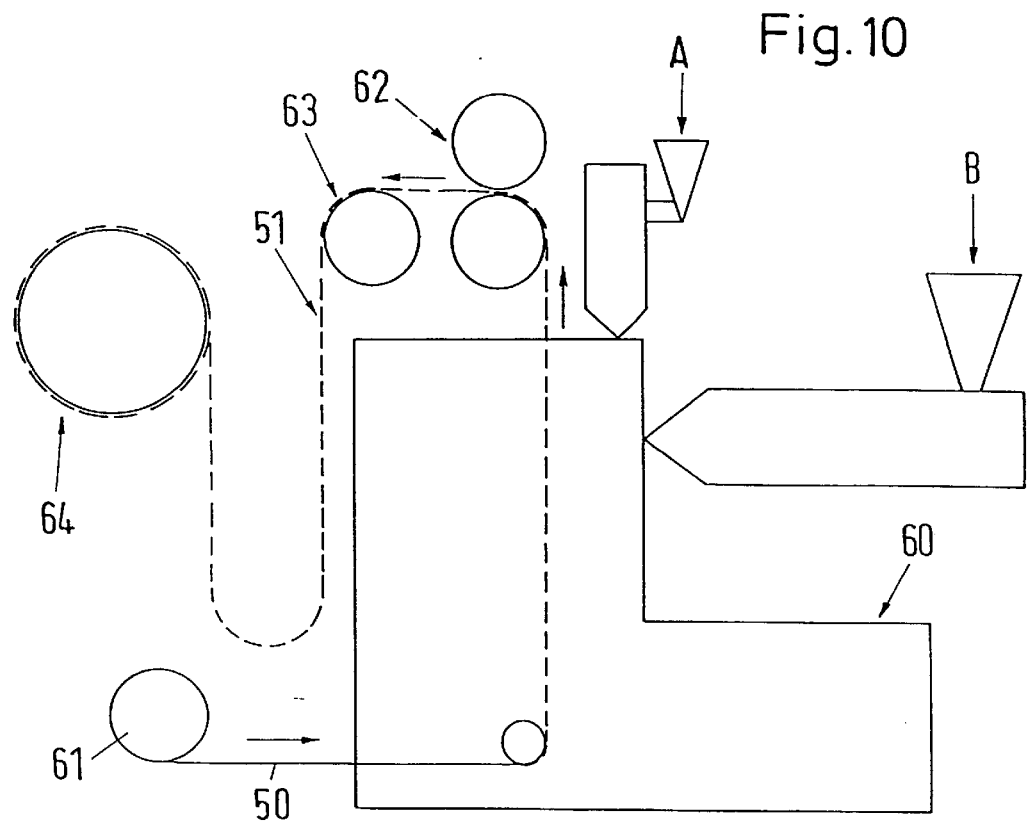
Figure 11:
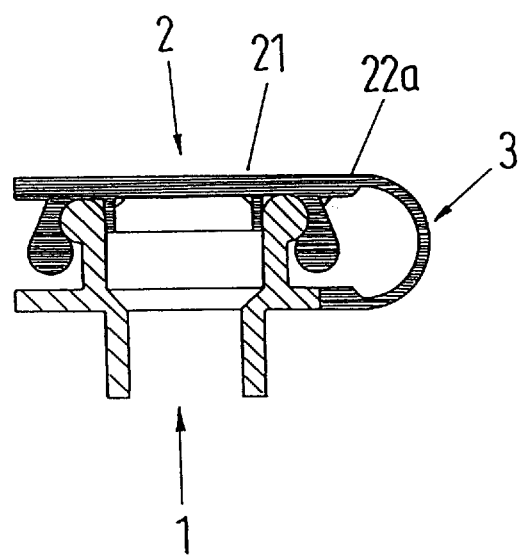

FIGS. 7 and 8 explain manufacture of the closure unit according to FIG. 6 by way of a section through the closure unit, showing the movement of the pushing devices (FIG. 7) and a time-dependency diagram of the casting operation (FIG. 8);

FIG. 9 is a quasi endless strip of closure units according to the invention;

FIG. 10 is a drawing of an arrangement for manufacture of the closure units according to the invention; and FIG. 11 shows, in section, by way of example, the closed condition of a plastics closure according to the invention in the form of a closure unit for fitting to a neckless formed body. This closure unit is one example of an embodiment of the closure. As already mentioned in the introduction, many other embodiments are possible.

Figure 1:
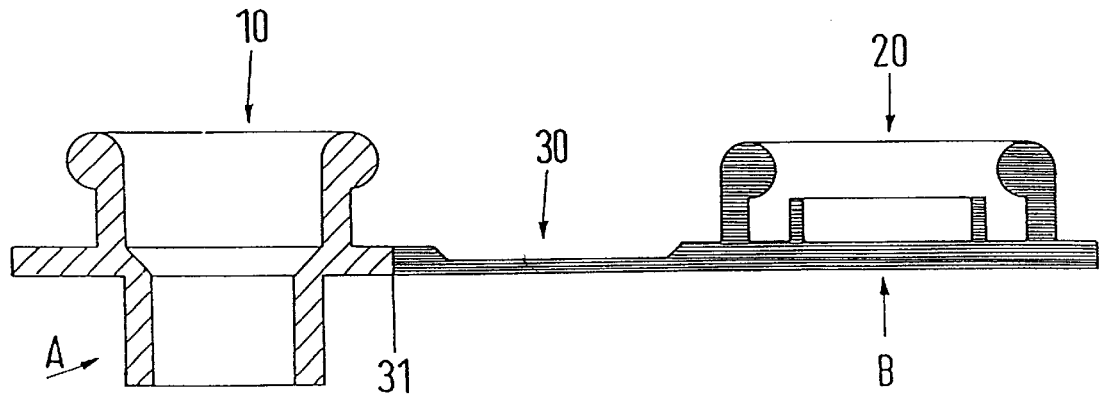

FIG. 1 is a section through an embodiment of the closure unit according to the invention, given by way of example, showing it in the way in which it is manufactured, thus in the open condition. The closure unit has an outlet part 10, a closure part 20 and a connecting part 30, wherein the outlet part is made of outlet material A and the closure part is made of closure part material B. Both parts are joined together in the region of the connecting part 30 by a flow seam 31. Possible positions of the two infusion openings in the casting cavity for manufacture of the closure unit shown are indicated by the two arrows A and B.

Figure 2:
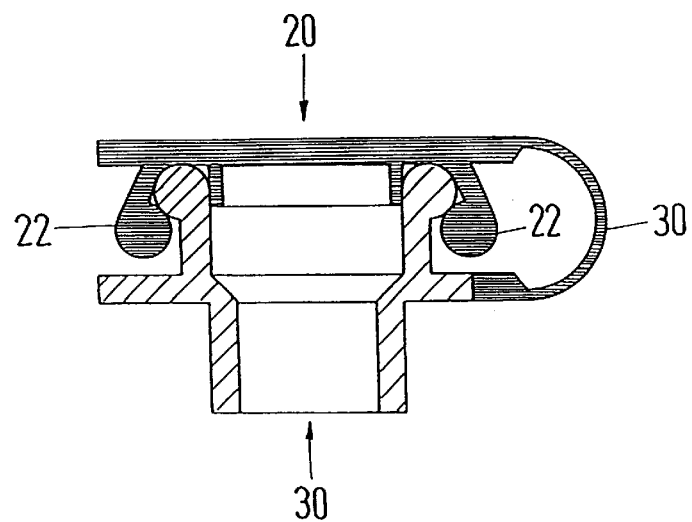
FIG. 2 is the closure unit according to FIG. 1 in the closed condition (section)

FIG. 2 shows the same closure unit as in FIG. 1, in the closed condition. If a comparison is made between FIGS. 1 and 2 it can be seen that when the closure unit is being closed and opened, the connecting part 30 and the regions 22 of the closure part which act as the outlet part and the closure part are greatly deformed. In order that the closure unit will survive a number of opening- and closing operations without any damage, and in order that the closure unit continues to close in a satisfactory seal-tight manner even after a number of such operations, the material of these regions must be suitably soft and elastic. However, this also means that the material of the outlet part has to be suitably stiff to ensure that the closure unit is mechanically stable. If the closure unit is to be able to be secured to a formed body by welding, the material of the outlet must also be weldable.

All the above requirements are satisfied by the crystalline and non-crystalline polypropylene pair of materials, whereby a fixed flow seam 31 is also able to be produced between the two materials A and B in the region of the connecting location 30.

The closure unit is manufactured by injecting the two materials substantially simultaneously into a casting cavity which represents the negative of the closure unit in the open condition, e.g. through one casting entrance in the region of the outlet part (arrow A) and through one casting entrance in the region of the closure part (arrow B). The exact starting point and the speeds of the two simultaneous casting operations are such that the two materials meet one another in the region of the connecting location.

The exact position of the flow seam between the two materials and its shape are determined by the shape of the casting cavity, the starting point and speed of the two simultaneous casting operations, and by the condition of the two materials which meet one another (temperature, viscosity). The position and shape of the flow seam can vary according to the method used. To avoid this inaccuracy, or to produce a specific shape of seam, pushing devices can also be provided in the casting cavity at the positions provided for the flow seam, and these pushing devices are drawn towards the flow seam position directly after meeting at least one of the two materials. A flow seam produced with pushing device is accurately positioned, and has an accurate, predetermined shape. However, its adhesion is less than with a corresponding flow seam produced without pushing devices.

A pushing device is necessary particularly if the one material for producing a cold flow seam should have already cooled to some extent when it meets the other material, with the seam position therefore being reached somewhat earlier. Pushing devices can also be used should the contact face of the two materials be shaped in such a way that the two areas of material are also form-fittingly joined together.

Figure 3:
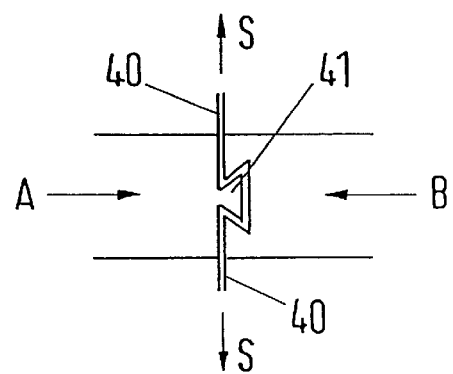
FIG. 3 is a detail of a casting cavity with pushing devices.

FIG. 3 shows, in detail, the region of the flow seam in a casting cavity for the manufacture of a form-fit flow seam. Two pushing devices 40 are provided at the selected position of the flow seam. The movement of these pushing devices is coordinated with the casting operation in such a way that it is removed from the casting cavity after meeting material A, but before meeting material B (arrow S). This means that the material A receives a boundary face which corresponds in shape to the pushing device and which forms a moulded-in configuration. After the pushing device has been removed from the material B casting takes place around this moulded-in configuration, whereby a form-fit is produced between the two materials, in addition to the join of the flow seam.

Figure 4:
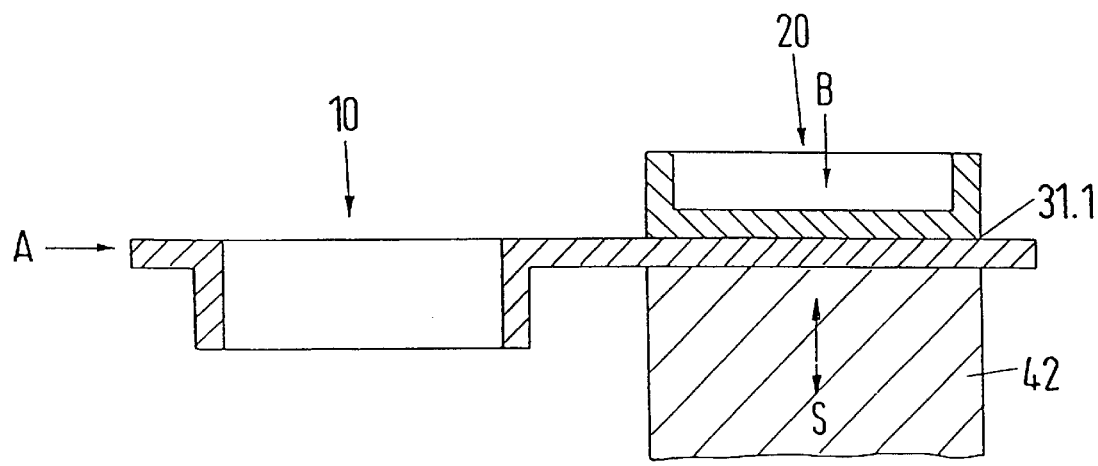
FIGS. 4 to 6 are further embodiments, by way of example, of the closure unit according to the invention.

FIG. 4 shows, very schematically, another embodiment of the closure unit according to the invention, by way of example. With this embodiment, the outlet part 10 is made entirely of the outlet material A, and the closure part 20 consists partly of closure material B and partly of outlet material A. The flow seam 31.1 passes over the entire closure part in such a way that only a very small amount of closure material B is required to manufacture the closure unit. Positions for the casting opening are, in turn, indicated by the arrows A and B.

A closure unit, as shown in FIG. 4, is advantageous if the material B of the closure is expensive, as is the case with EVOH, for example. However, owing to its high gas density, EVOH is the most advantageous barrier layer material for closure units such as those used for carbonated drinks. For these reasons, the embodiment of FIG. 4 with PET as the outlet material and EVOH as the closure material offers a good gas-tight closure unit in respect of the cost of the material.

A pushing device 42 in the hollow mould is necessary to manufacture the embodiment according to FIG. 4. At the start of the casting operation, this pushing device is in a position which is higher by the thickness of the material A in the closure part than the position of the pushing device shown in FIG. 4. The two, quasi simultaneous casting operations of the materials A and B are coordinated in such a way that the casting operation of the material B is concluded and the pushing device 42 is moved into its bottom position (arrow S) before the material A reaches the region of the closure part. The flow seam produced is a cold flow seam.

Figure 5:
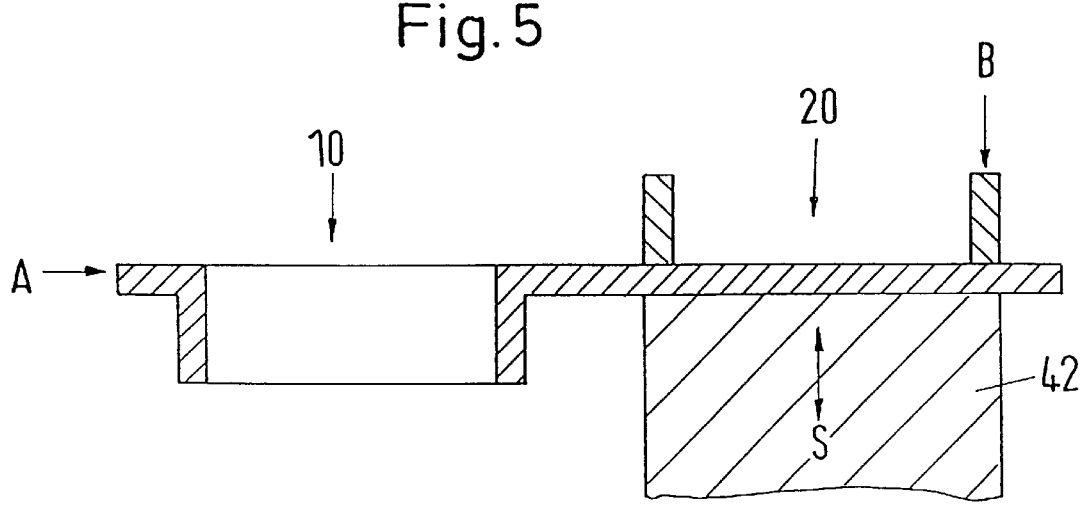

FIG. 5 shows, again very schematically, another embodiment by way of example wherein the region of the closure material B is further reduced. The closure material B actually forms only those regions of the closure part 20 which form the sealing faces for the closed closure unit. Also, a movable pushing device 42 in the casting cavity is required to produce this closure unit. The individual parts of the closure unit and manufacture are basically the same as those for the closure unit of FIG. 4, and the same reference numerals are therefore used.

FIG. 6 shows another embodiment of the closure unit according to the invention in which the region of the outlet material A is substantially reduced to the sealing faces in such a way that the outlet material A merely forms a sealing ring 11 which is joined to the actual outlet part 10 by a flow seam, and the rest of the closure unit, particularly the sealing face on the side of the closure part is made of the closure material B.

FIGS. 7 and 8 show schematically the way in which the closure unit according to FIG. 6 is manufactured, with a sectional drawing showing the movement of the pushing devices (FIG. 7), and a time-dependency diagram (FIG. 8) for the two quasi simultaneous casting operations (A and B) and the movement of the pushing devices (S).

The pushing device 43 is arranged in the region of the closure unit 10 and has two positions, an upper position o, as required for the casting of the material A of the outlet or of the sealing ring 11, and, shown to the right of the drawing a lower position u in which the sealing ring 11 adopts its definitive position in relation to the outlet part 10 or opposite the casting cavity for the rest of the parts of the closure unit, and is shown to the left.

As can be seen from the time-dependent diagram (FIG. 8), there is a time delay $t_1$ between the start of the casting of material B and casting of material A. The pushing device 43 is moved from its upper (o) position into its lower (u) position, as soon as the material A has been cast, before the material B has reached the region of the sealing ring. The temporal range $t_2$ represents the compressing time at dwell pressure which is followed by the cooling stage. Associated with the casting cycle are also the opening of the hollow mould, the ejection of the closure unit, and re-closure of the mould, during which the pushing device 43 is also pushed back into its upper position. None of these operations differs from the corresponding operations with the casting of only one material, and they are not shown in the time-dependent diagram.

In a similar way to the manufacture of a sealing ring, as shown in FIGS. 6 to 8, which is connected by a flow seam to the outlet part, it is possible to manufacture a sealing ring which is secured in the closure part by way of a flow seam.

FIG. 9 shows schematically a quasi endless strip of closure units according to the invention. They are arranged in rows on two threads 50. A row of this kind is produced by the pair of threads being guided through the casting cavity, and being advanced in coordinated manner with the casting cycle. Advantageously, the threads are not entirely infused since they would then have to be cut during further processing of the closure units, or the closure units would run the risk of becoming detached from the threads. Instead, casting only takes place around part of the threads, so that the closure units are reliably secured thereto, but are still easily able to be separated without damage.

A quasi continuous strip of this kind of closure units can be stored in a rolled up condition, and can be continuously supplied to an apparatus for further processing, e.g. for fixing the closure units to the corresponding formed bodies, and the threads can be re-used.

Instead of a pair of threads, the closure units according to the invention can be provided with transportation means and storage aids in the form of only one thread, a number of threads or a foil strip.

FIG. 10 shows schematically an arrangement for manufacturing closure units according to the invention in the form of a quasi endless strip, as shown in FIG. 9, for example. The arrangement has a per se known injection moulding machine 60 which is set up for simultaneous casting of two materials A and B and controlled accordingly. One pair 50 of threads or another quasi endless transportation means and storage means is drawn from a supply roll 61 through the hollow cavity of the machine by means of feed rollers 62. The pair of threads 50 conveys the cast closure units from the casting machine in the form of a quasi continuous strip 51. This is wound around a direction-changing roller 63 and is wound up on a storage/conveyer roller 64.

The closure unit according to the other embodiment in FIG. 11 consists of an outlet part (opening part) 1, a closure part 2 and a connecting part 3. Provided between the closure part and the outlet part is an inner pair 21 of sealing faces and an outer pair 22a of sealing faces. By way of example, the outlet part consists of a substantially stiff material, and the closure part consists of a flexible and elastic material, wherein the two materials are joined together in the region of the connecting location 3 by means of a flow seam. When the closure unit is opened and closed, the closure part is deformed in such a way that the pair of sealing faces is pressed against one another in the closed condition.

For the embodiment, shown in FIG. 11, of the closure according to the invention, the outer pair 22a of sealing faces is particularly suitable as the mechanical sealing. The inner pair 21 of sealing faces is better accessible for heat treatment, particularly in the closed condition of the closure unit, so that the sealing faces which are already superposed and pressed together, e.g. by welding, are able to produce the additional join by adhesion.

Clearly, it is also possible for only the outer pair of sealing faces to be provided and their sealing faces to be joined together by way of an adhesive connection.

It can be seen that closure units, as shown in FIG. 1, have good properties if their outlet parts are made from a crystalline or part crystalline material and if their closure parts are made from a non-crystalline material. Crystalline and non-crystalline polypropylene are particularly suitable.

I claim:

1. A plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, characterized in that the closure unit has a region made of outlet material (A) and a region made of closure material (B), wherein one sealing face, on the outlet part, is made at least partly of the outlet material (A), and one sealing face, on the closure part, is made at least partly of the closure material (B), and that the region made of outlet material (A) and the region made of closure material (B) are joined together by simultaneous processing of the materials to form a flow seam (31) during a casting operation used to form the closure unit, the outlet material (A) and the closure material (B) being different materials, the outlet material extending into the closure part, and the flow seam being at least partially formed in the closure part, or the closure material extending into the outlet part, and the flow seam being at least partially formed in the outlet part, and the outlet material (A) forming a sealing ring (11) which is secured at the outlet part (10) by the flow seam, the rest of the outlet part and the closure part being made of the closure material (B).

2. A plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, characterized in that the closure unit has a region made of outlet material (A) and a region made of closure material (B), wherein one sealing face, on the outlet part, is made at least partly of the outlet material (A), and one sealing face, on the closure part, is made at least partly of the closure material (B), and that the region made of outlet material (A) and the region made of closure material (B) are joined together by simultaneous processing of the materials to form a flow seam (31) during a casting operation used to form the closure unit, the outlet material (A) and the closure material (B) being different materials, one of the outlet material (A) and the closure material (B) being more flexible and more elastic than the other, one of the outlet material (A) and the closure material (B) being crystalline, the other being non-crystalline, and a second order transition temperature of the crystalline material is within the melting range of the non-crystalline material.

3. A plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, characterized in that the closure unit has a region made of outlet material (A) and a region made of closure material (B), wherein one sealing face, on the outlet part, is made at least partly of the outlet material (A), and one sealing face, on the closure part, is made at least partly of the closure material (B), and that the region made of outlet material (A) and the region made of closure material (B) are joined together by simultaneous processing of the materials to form a flow seam (31) during a casting operation used to form the closure unit, the outlet material (A) and the closure material (B) being different materials, one of the outlet material (A) and the closure material (B) is more flexible and more elastic than the other, and one of the outlet material (A) and the closure material (B) is polyester (PET), polypropylene (PP) or polyethylene (PE), and the other one of the outlet material (A) and the closure material (B) is ethylene vinyl alcohol copolymer (EVOH), semi-crystalline polyamide (MXD-6) manufactured by polycondensation of metaxylene diamine and adipic acid, liquid-crystal polymer (LCP), polyethylene naphthalate (PEN), polyacryonitrile (PAN), non-crystalline polyamide (APA), polyvinylidene chloride (PVDC) or a polymer filled with a scavenger.

4. A method, for the manufacture of a plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, the closure unit having a region made of outlet material (A) and a region made of closure material (B), wherein one sealing face, on the outlet part, is made at least partly of the outlet material (A), and one sealing face, on the closure part, is made at least partly of the closure material (B), and the region made of outlet material (A) and the region made of closure material (B) are joined together by simultaneous processing of the materials to form a flow seam (31) during a casting operation used to form the closure unit, the outlet material (A) and the closure material (B) being different materials, said method being characterized in that, the outlet material (A) is cast into a casting cavity of a hollow mould, the casting cavity representing a negative of the closure unit in the open condition, through an infusion opening in a region of the casting cavity corresponding to the outlet part, substantially simultaneously with the closure material (B) being cast into the casting cavity through an infusion opening in a region of the casting cavity corresponding to the closure part, that the casting of the outlet material (A) and the closure material (B) into the casting cavity are coordinated in such a way that the outlet material and the closure material (A, B) meet one another at a location of the casting cavity provided for the flow seam and form a flow seam (31), that, for the purpose of position and/or shaping the flow seam, individual parts of the hollow mould are moved during the casting operation, and that the movable hollow mould parts are designed in such a way that the flow seam (31) between the two materials (A, B) represents a form-fit.

5. A method for the manufacture of a plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, the closure unit has a region made of outlet material (A) and a region made of closure material (B), wherein one sealing face, on the outlet part, is made at least partly of the outlet material (A), and one sealing face, on the closure part, is made at least partly of the closure material (B), and that the region made of outlet material (A) and the region made of closure material (B) are joined together by simultaneous processing of the materials to form a flow seam (31) during a casting operation used to form the closure unit, the outlet material (A) and the closure material (B) being different materials, wherein the closure unit is manufactured in the open condition by casting and is closed after manufacture, characterized in that the at least one pair of sealing faces is subjected to a heat treatment to produce a reversible connection between the at least one pair of sealing faces to seal the closure unit tightly prior to first use and thereby substantially prevent entrance of gases and germs.

6. A method for the manufacture of a plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, the closure unit has a region made of outlet material (A) and a region made of closure material (B), wherein one sealing face, on the outlet part, is made at least partly of the outlet material (A), and one sealing face, on the closure part, is made at least partly of the closure material (B), and that the region made of outlet material (A) and the region made of closure material (B) are joined together by simultaneous processing of the materials to form a flow seam (31) during a casting operation used to form the closure unit, the outlet material (A) and the closure material (B) being different materials, characterized in that the outlet material (A) is cast into a casting cavity of a hollow mould, the casting cavity representing a negative of the closure unit in the open condition, through an infusion opening in a region of the casting cavity corresponding to the outlet part, substantially simultaneously with the closure material (B) being cast into the casting cavity through an infusion opening in a region of the casting cavity corresponding to the closure part, and that the casting of the outlet material (A) and the closure material (B) into the casting cavity are coordinated in such a way that the outlet material and the closure material (A, B) meet one another at a location of the casting cavity provided for the flow seam and form a flow seam (31).

7. A plastics closure unit which has an outlet part (10), a closure part (20) which is joined to the outlet part even when the closure unit is in an open condition, and at least one pair of sealing faces which seals the outlet part and the closure part (10 and 20) together when the closure unit is in a closed condition, characterized in that the closure unit has a region made of outlet material (A) and a region made of closure material (B), wherein one sealing face, on the outlet part, is made at least partly of the outlet material (A), and one sealing face, on the closure part, is made at least partly of the closure material (B), that the region made of outlet material (A) and the region made of closure material (B) are joined together by simultaneous processing of the materials to form a flow seam (31) during a casting operation used to form the closure unit, the outlet material (A) and the closure material (B) being different materials, the outlet material extending into the closure part, and the flow seam being at least partially formed in the closure part, or the closure material extending into the outlet part, and the flow seam being at least partially formed in the outlet part, and that the closure material (B) forms a sealing ring (11) which is secured at the closure part by the flow seam, the rest of the closure part and the outlet part being made of the outlet material (A).

* * * * *